(12) United States Patent
Tanaka

(10) Patent No.: US 11,451,705 B2
(45) Date of Patent: Sep. 20, 2022

(54) IMAGING CONTROL APPARATUS, IMAGING CONTROL METHOD, AND STORAGE MEDIUM

(71) Applicant: CANON KABUSHIKI KAISHA, Tokyo (JP)

(72) Inventor: Ryo Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/318,935

(22) Filed: May 12, 2021

(65) Prior Publication Data
US 2021/0368092 A1 Nov. 25, 2021

(30) Foreign Application Priority Data

May 19, 2020 (JP) .............................. JP2020-087630

(51) Int. Cl.
*H04N 5/232* (2006.01)
*G06V 10/20* (2022.01)
*G06V 40/20* (2022.01)

(52) U.S. Cl.
CPC ....... *H04N 5/23218* (2018.08); *G06V 10/255* (2022.01); *G06V 40/28* (2022.01); *H04N 5/23296* (2013.01); *H04N 5/23299* (2018.08)

(58) Field of Classification Search
CPC ........... H04N 5/23218; H04N 5/23299; H04N 5/23296; H04N 5/23219; G06K 9/00355; G06K 9/3241; G06V 40/28; G06V 10/255
USPC .................................................... 348/240.99
See application file for complete search history.

(56) References Cited

U.S. PATENT DOCUMENTS

| | | | |
|---|---|---|---|
| 9,402,019 B2* | 7/2016 | Yata ................. | H04N 5/232125 |
| 10,656,754 B1* | 5/2020 | Smith .................... | G06F 3/045 |
| 10,863,056 B2* | 12/2020 | Sakashita ............ | G06V 40/172 |
| 10,999,495 B1* | 5/2021 | Lee .................... | H04N 5/23245 |
| 2010/0315521 A1* | 12/2010 | Kunishige .............. | G06V 20/40 348/220.1 |
| 2013/0300917 A1* | 11/2013 | Yata ................... | H04N 5/23218 348/349 |
| 2014/0211047 A1* | 7/2014 | Lee .................... | H04N 5/23216 348/240.99 |
| 2015/0201124 A1* | 7/2015 | Litvak ............... | H04N 5/23219 348/77 |
| 2019/0064794 A1* | 2/2019 | Chen .................... | G05D 1/0016 |
| 2019/0281187 A1* | 9/2019 | Sakashita ............... | H04N 1/442 |
| 2020/0401794 A1* | 12/2020 | Ishii ..................... | G06V 40/174 |
| 2021/0136279 A1* | 5/2021 | Lee .................... | H04N 5/23245 |

FOREIGN PATENT DOCUMENTS

JP 2013223244 A 10/2013

* cited by examiner

*Primary Examiner* — Pritham D Prabhakher
(74) *Attorney, Agent, or Firm* — Canon U.S.A., Inc., IP Division

(57) ABSTRACT

An imaging control apparatus detects a gesture of a person in an image and motion information of the gesture. The imaging control apparatus firstly determines whether the detected gesture is a gesture requiring an angle-of-view change. In a case where the detected gesture is the gesture requiring an angle-of-view change, the imaging control apparatus secondly determines whether a time elapsed since the last time a gesture requiring an angle-of-view change is made is within a predetermined time. The imaging control apparatus generates a pan operation command to change an angle of view based on the second determination result.

16 Claims, 8 Drawing Sheets

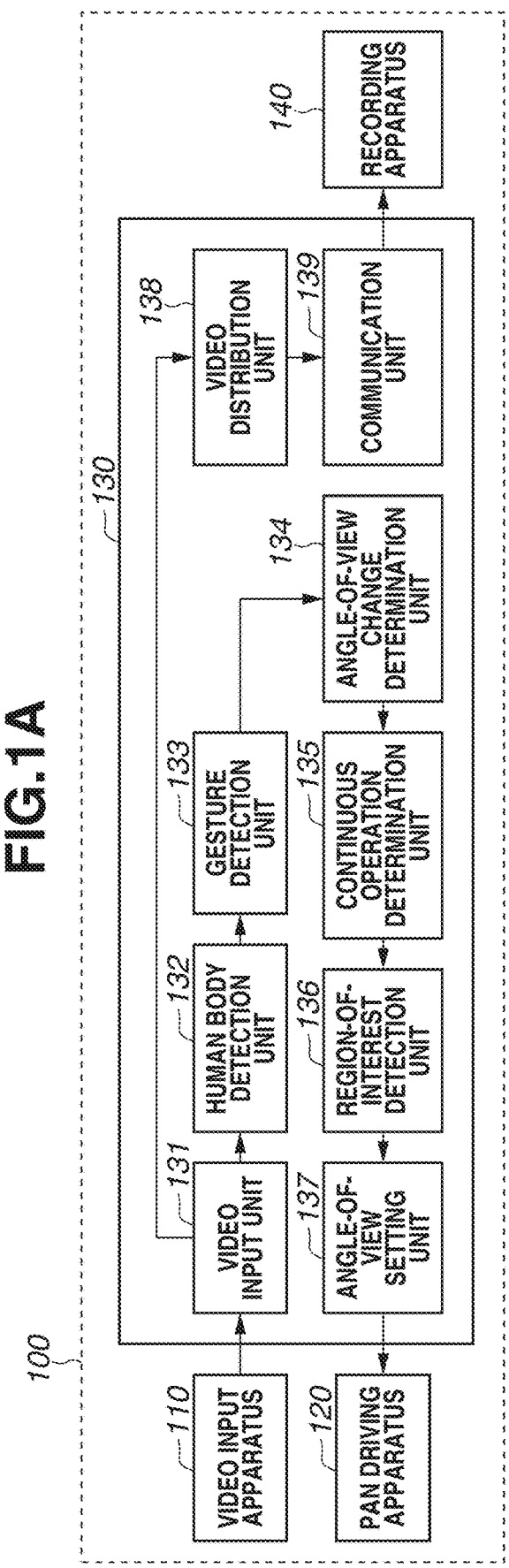
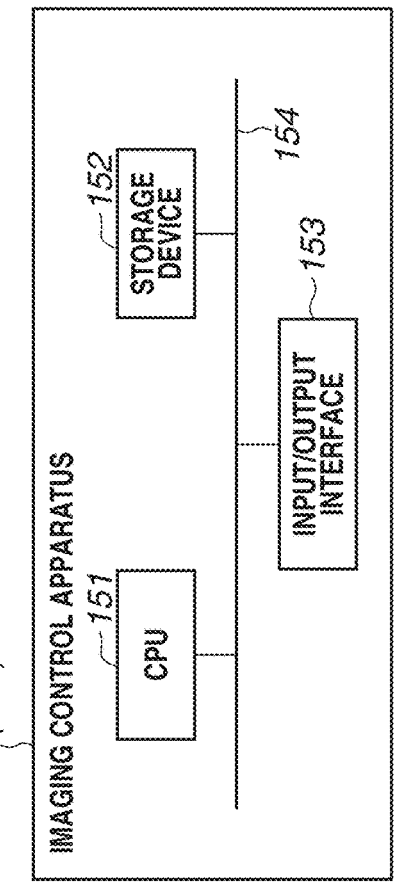

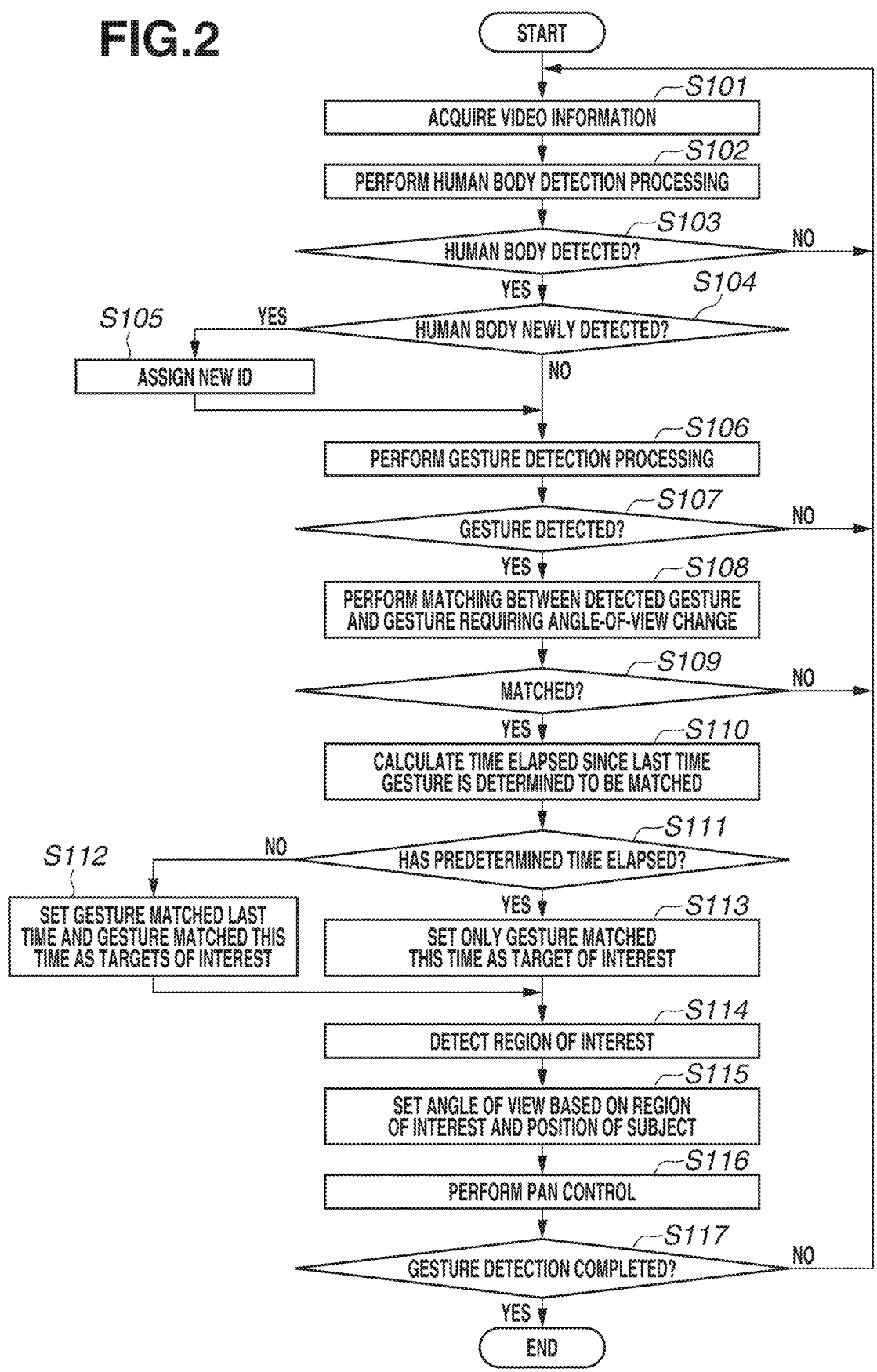

FIG.6

| No. | GESTURE MOTION INFORMATION 601 | ANGLE-OF-VIEW CHANGE 602 | CONTINUOUS GESTURE ACCEPTANCE 603 | CONTINUOUS GESTURE ACCEPTANCE TIME CORRECTION VALUE 604 | GESTURE INHIBITION PROCESSING FLAG 605 | GESTURE INHIBITION TIME 606 |
|---|---|---|---|---|---|---|
| 1 | POINT FINGER AT REGION | REQUIRED | ALLOWED | 20 SECONDS | NONE | NONE |
| 2 | DRAW CIRCLE SURROUNDING REGION WITH FINGER | REQUIRED | NOT ALLOWED | NONE | INHIBIT | 30 SECONDS |
| 3 | MAKE "X" WITH BOTH HANDS | NOT REQUIRED | NOT ALLOWED | NONE | INHIBIT | 999 HOURS |
| 4 | PUT RAISED HANDS DOWN | NOT REQUIRED | NOT ALLOWED | NONE | CANCEL INHIBITION | NONE |

IMAGING CONTROL APPARATUS, IMAGING CONTROL METHOD, AND STORAGE MEDIUM

BACKGROUND

Field

The present disclosure relates to an imaging control apparatus, an imaging control method, and a storage medium.

Description of the Related Art

There is known a conventional technique in which various operations of a camera are controlled based on a predetermined gesture performed by a subject, as discussed in Japanese Patent Application Laid-Open No. 2013-223244.

SUMMARY

The present disclosure is directed to capturing an image with an appropriate angle of view based on a gesture of a person serving as an image capturing target.

According to an aspect of the present disclosure, an imaging control apparatus includes an input unit configured to receive an image from an imaging unit, a gesture detection unit configured to detect a gesture of a person in the image, a first determination unit configured to perform first determination processing for determining whether the gesture detected by the gesture detection unit is a predetermined gesture, a second determination unit configured to, in a case where the gesture is determined at a first time point to be the predetermined gesture in the first determination processing, determine whether a time elapsed since a second time point at which it is previously determined in the first determination processing that the detected gesture is the predetermined gesture is within a predetermined time, and a control unit configured to change an angle of view of the imaging unit based on a result of the determination by the second determination unit.

Further features of the present disclosure will become apparent from the following description of exemplary embodiments with reference to the attached drawings.

BRIEF DESCRIPTION OF THE DRAWINGS

FIG. 1A is a block diagram illustrating an example of an overall configuration of an imaging system according to a first exemplary embodiment. FIG. 1B is a block diagram illustrating an example of a configuration of an imaging control apparatus.

FIG. 2 is a flowchart illustrating angle-of-view control processing according to the first exemplary embodiment.

FIG. 6 is a diagram illustrating feature information according to the second exemplary embodiment.

DESCRIPTION OF THE EMBODIMENTS

Figure 3:
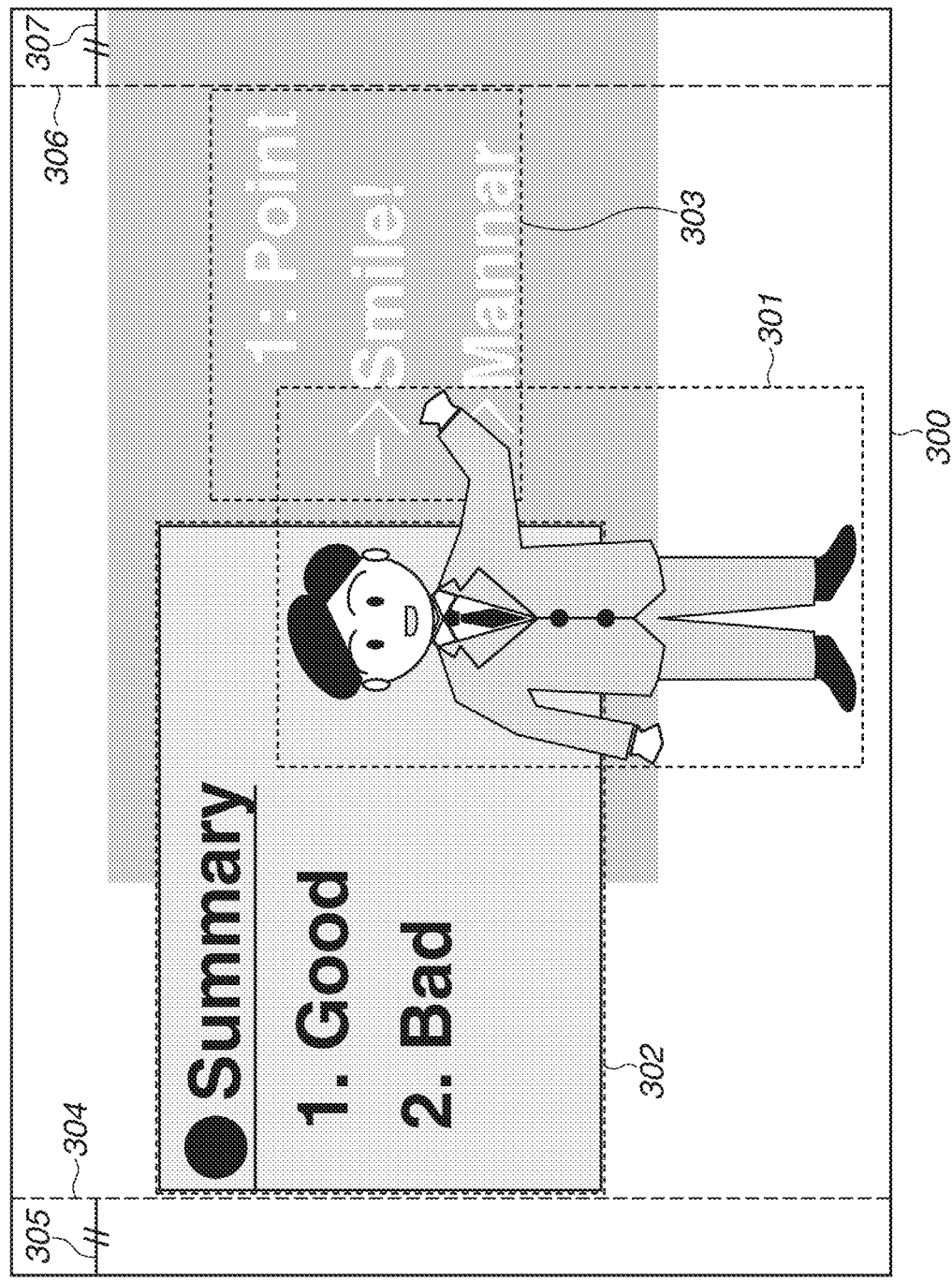
FIG. 3 is a diagram illustrating an angle-of-view calculation method according to the first exemplary embodiment.

A first exemplary embodiment will be described with reference to the accompanying drawings.

<Overall Configuration of Imaging System>

FIG. 1A is a diagram illustrating an example of an overall configuration of an imaging system 100 according to the present exemplary embodiment. The imaging system 100 includes an imaging control apparatus 130 according to the present exemplary embodiment. The imaging system 100 changes the angle of view based on a gesture of a person serving as an image capturing target and captures an image of the person.

As illustrated in FIG. 1A, the imaging system 100 includes a video input apparatus 110, a pan driving apparatus 120, the imaging control apparatus 130, and a recording apparatus 140. The imaging control apparatus 130 and the recording apparatus 140 are connected to each other via a video interface. Each of the apparatuses of the imaging system 100 will be described next.

The video input apparatus 110 captures an image of the surroundings to generate video information, and includes a camera, for example. The video input apparatus 110 outputs the video information to the imaging control apparatus 130. The video input apparatus 110 is an example of an imaging apparatus.

The pan driving apparatus 120 changes an imaging direction (pan direction) of the video input apparatus 110, and includes a motor, a gear, and the like. When receiving a series of commands for performing a pan operation from the imaging control apparatus 130, the pan driving apparatus 120 drives the motor to perform the pan operation based on the received commands.

The imaging control apparatus 130 analyzes the video information of the image captured by the video input apparatus 110 and performs control to change the angle of view of the video input apparatus 110. More specifically, the imaging control apparatus 130 generates the commands for performing the pan operation based on a gesture detected from the video information. The imaging control apparatus 130 then outputs the generated commands to the pan driving apparatus 120. The imaging control apparatus 130 also outputs the video information input from the video input apparatus 110 to the recording apparatus 140.

The recording apparatus 140 performs processing for storing the video information input from the imaging control apparatus 130 in a storage device such as a hard disk drive (HDD).

<Hardware Configuration of Imaging Control Apparatus>

Next, a hardware configuration of the imaging control apparatus 130 will be described with reference to FIG. 1B. The imaging control apparatus 130 includes, as hardware components, a central processing unit (CPU) 151, a storage device 152, an input/output interface 153, and a bus 154 that connects these components.

The CPU 151 controls the entire imaging control apparatus 130. Various functions of the imaging control apparatus 130 and processing in a flowchart illustrated in FIG. 2 are implemented by the CPU 151 performing processing based on a program stored in the storage device 152.

The storage device 152 is a random-access memory (RAM), a read-only memory (ROM), or a hard disk drive (HDD), or the like, and stores therein a program and data to be used when the CPU 151 performs processing based on the program.

The input/output interface 153 controls input and output between the imaging control apparatus 130 and an external apparatus such as the video input apparatus 110. The input/output interface 153 includes the video interface that connects the imaging control apparatus 130 and the recording apparatus 140 to each other.

<Functional Configuration of Imaging Control Apparatus>

The CPU 151 executes a program stored in the storage device 152 to cause the imaging control apparatus 130 to function as a video input unit 131, a human body detection unit 132, a gesture detection unit 133, an angle-of-view change determination unit 134, a continuous operation determination unit 135, a region-of-interest detection unit 136, an angle-of-view setting unit 137, a video distribution unit 138, and a communication unit 139, as illustrated in FIG. 1A. Each of the units of the imaging control apparatus 130 will be described in detail next.

The video input unit 131 inputs the video information of the image captured by the video input apparatus 110, and outputs the video information to the human body detection unit 132 and the video distribution unit 138. In addition, the video input unit 131 records the video information in the storage device 152. The video input unit 131, for example, records the video information for the past 60 frames in the storage device 152.

The human body detection unit 132 analyzes the video information input from the video input unit 131 to detect a human body. More specifically, the human body detection unit 132 performs human body detection processing on the video information to detect a human body in the video image. Examples of a human body detection method include a template matching method and a method using deep learning. When detecting a human body, the human body detection unit 132 acquires coordinate information (region information) of the human body. In addition, the human body detection unit 132 assigns unique identification (ID) to each of all detected human bodies. At this time, the human body detection unit 132 refers to the past human body detection results recorded in the storage device 152. In a case where the human body detected this time is identical to a human body detected in the past, the human body detection unit 132 assigns, to the human body detected this time, the same ID as that of the human body detected in the past. The human body detection unit 132 then outputs the video information, the human body coordinate information, and the ID information to the gesture detection unit 133. The coordinate information is output as absolute coordinates in a spherical-coordinate system. The human body detection unit 132 is equivalent to a person detection unit.

The gesture detection unit 133 analyzes the information such as the video information input from the human body detection unit 132 to detect a gesture. More specifically, the gesture detection unit 133 detects a gesture of the human body in the video image, using the video information for the past 60 frames read out from the storage device 152. The storage device 152 stores, for each of the IDs of the human bodies, past human body coordinate information and past video information, and the gesture detection unit 133 detects a gesture for each of the IDs of the human bodies. Examples of a gesture detection method include a block matching method and a method of using deep learning to detect a gesture from human body motion. When detecting a gesture, the gesture detection unit 133 selects the coordinate information and ID information of the human body whose gesture has been detected, from among the pieces of human body coordinate information and pieces of ID information input from the human body detection unit 132. The gesture detection unit 133 then outputs the selected human body coordinate information and ID information, together with motion information of the detected gesture and the video information, to the angle-of-view change determination unit 134.

The angle-of-view change determination unit 134 determines whether the gesture detected by the gesture detection unit 133 is a gesture requiring an angle-of-view change. Determination processing performed by the angle-of-view change determination unit 134 is equivalent to first determination processing. More specifically, the angle-of-view change determination unit 134 reads out the motion information of a gesture requiring an angle-of-view change (hereinafter also referred to as an angle-of-view change gesture or a predetermined gesture) that is pre-stored in the storage device 152. The angle-of-view change determination unit 134 then performs matching between the read out motion information of the angle-of-view change gesture and the motion information of the gesture input from the gesture detection unit 133. In a case where the matching succeeds, the angle-of-view change determination unit 134 determines that the detected gesture is the gesture requiring an angle-of-view change, and records in the storage device 152 the time when the determination is made, as the time point when the angle-of-view change gesture is made (which corresponds to the time point when the first determination processing is performed). In addition, the angle-of-view change determination unit 134 records the information input from the gesture detection unit 133 in the storage device 152 in association with the time point when the angle-of-view change gesture is made. More specifically, the storage device 152 stores the time point when the angle-of-view change gesture is made and the motion information of the gesture (which is the gesture determined to be the gesture requiring an angle-of-view change in the first determination processing) on a time-series basis. The angle-of-view change determination unit 134 then outputs the human body coordinate information, the ID information, the gesture motion information, and the video information, which are input from the gesture detection unit 133, to the continuous operation determination unit 135. In a case where the matching fails, the angle-of-view change determination unit 134 determines that the detected gesture is not the gesture requiring an angle-of-view change, and outputs nothing. The angle-of-view change determination unit 134 is equivalent to a first determination unit.

The continuous operation determination unit 135 determines whether the angle-of-view change gesture made last time and the angle-of-view change gesture made this time are continuous gestures. More specifically, when receiving an input from the angle-of-view change determination unit 134, the continuous operation determination unit 135 calculates the time elapsed since the last time point when the angle-of-view change gesture is made. In a case where the elapsed time is within a predefined time (predetermined time), the continuous operation determination unit 135 determines that the angle-of-view change gesture made last time and the angle-of-view change gesture made this time are continuous gestures. The continuous operation determination unit 135 then outputs the information input from the angle-of-view change determination unit 134 this time and the information input from the angle-of-view change determination unit 134 last time together to the region-of-interest detection unit 136. For example, the continuous operation determination unit 135 reads out, from the storage device 152, the information stored in association with the time when the angle-of-view change gesture is made this time and the time when the angle-of-view change gesture is made last time, and outputs the information to the region-ofinterest detection unit 136. In a case where the elapsed time exceeds the predefined time (predetermined time), the continuous operation determination unit 135 determines that the angle-of-view change gesture made this time is a one-shot gesture and outputs only the information input from the angle-of-view change determination unit 134 this time to the region-of-interest detection unit 136. The continuous operation determination unit 135 is equivalent to a second determination unit.

The region-of-interest detection unit 136 detects a region of interest pointed by the gesture. For example, in a case where the human body makes a finger pointing gesture, the region-of-interest detection unit 136 estimates the pointed region by calculating a finger pointing angle based on information regarding estimated joints of the human body detected using deep learning, and detects the estimated region as the region of interest. In a case where the motion information of a plurality of gestures is input from the continuous operation determination unit 135, the region-of-interest detection unit 136 detects the regions of interest corresponding to all the pieces of input motion information. The region-of-interest detection unit 136 outputs the human body coordinate information input from the continuous operation determination unit 135 and coordinate information of all the regions of interest detected by the region-of-interest detection unit 136 to the angle-of-view setting unit 137. The coordinate information is output as absolute coordinates in the spherical-coordinate system. The region-of-interest detection unit 136 is equivalent to a region detection unit.

The angle-of-view setting unit 137 calculates the angle of view so that the human body and all the regions of interest are within the angle of view, based on the human body coordinate information and the coordinate information of all the regions of interest, which are input from the region-of-interest detection unit 136. Details of an angle-of-view calculation method will be described below with reference to FIG. 3. The angle-of-view setting unit 137 then generates a pan operation command so as to achieve the calculated angle of view. The angle-of-view setting unit 137 outputs the generated pan operation command to the pan driving apparatus 120. The angle-of-view setting unit 137 is equivalent to an angle-of-view control unit.

When receiving the video information from the video input unit 131, the video distribution unit 138 outputs the video information to the communication unit 139.

The communication unit 139 outputs the video information input from the video distribution unit 138 to the recording apparatus 140.

<Angle-of-View Calculation Method>

An example of the angle-of-view calculation method according to the present exemplary embodiment will be described with reference to FIG. 3. A video image 300 is captured by the imaging system 100 controlling the angle of view. The video image 300 includes regions 301 to 303. The region 301 corresponds to the coordinate information of the human body that makes the gesture. The regions 302 and 303 correspond to the respective pieces of coordinate information of the regions of interest.

The angle-of-view setting unit 137 calculates a left end coordinate 304 and a right end coordinate 306. The left end coordinate 304 is a coordinate in a lateral direction (hereinafter referred to as an x-coordinate) at the leftmost end among the coordinates of the human body and the coordinates of all the regions of interest. A left end margin 305 is a distance in the x-coordinate from the left end of the angle of view of the video image 300 to the left end coordinate 304. Similarly, the right end coordinate 306 is an x-coordinate at the rightmost end among the coordinates of the human body and the coordinates of all the regions of interest. A right end margin 307 is a distance in the x-coordinate from the right end of the angle of view of the video image 300 to the right end coordinate 306. The angle-of-view setting unit 137 calculates the angle of view in the lateral direction (pan direction) so as to make the distance of the left end margin 305 and the distance of the right end margin 307 equal to each other.

<Angle-of-View Control Processing>

Next, angle-of-view control processing performed by the imaging system 100 according to the present exemplary embodiment will be described with reference to a flowchart illustrated in FIG. 2. The angle-of-view control processing is started when the imaging system 100 is activated by a user's operation.

In step S101, the CPU 151 acquires video information from the video input apparatus 110 and records the acquired video information in the storage device 152. The processing then proceeds to step S102.

In step S102, the CPU 151 performs human body detection processing on the acquired video information. The processing then proceeds to step S103.

In step S103, the CPU 151 determines whether a human body is detected as a result of the human body detection processing. If the CPU 151 determines that a human body is detected (YES in step S103), the processing proceeds to step S104. If the CPU 151 determines that no human body is detected (NO in step S103), the processing returns to step S101.

In step S104, the CPU 151 determines whether the human body has never been detected in the past. If the CPU 151 determines that the human body is newly detected (YES in step S104), the processing proceeds to step S105. If determining that the human body is identical to a human body detected in the past (NO in step S104), the CPU 151 assigns, to the human body, the same ID as that of the human body detected in the past, and the processing proceeds to step S106.

In step S105, the CPU 151 assigns new ID to the newly detected human body. The processing then proceeds to step S106.

In step S106, the CPU 151 detects a gesture of the human body from the video image, using the coordinate information and ID information of the human body detected in step S102 and using the human body coordinate information and video information stored in the past in the storage device 152. The processing then proceeds to step S107.

In step S107, the CPU 151 determines whether a gesture is detected. If the CPU 151 determines that a gesture is detected (YES in step S107), the processing proceeds to step S108. If the CPU 151 determines that no gesture is detected (NO in step S107), the processing returns to step S101.

In step S108, the CPU 151 performs matching between the motion information of the angle-of-view change gesture stored in the storage device 152 and the motion information of the detected gesture. The processing then proceeds to step S109.

In step S109, the CPU 151 determines whether the motion information of the detected gesture is matched with the motion information of the angle-of-view change gesture. If determining that the motion information of the detected gesture is matched with the motion information of the angle-of-view change gesture (YES in step S109), the CPU 151 records in the storage device 152 the motion information of the gesture determined to be matched, in association with the time point when the motion information of the gesture is determined to be matched, and the processing proceeds to step S110. If the CPU 151 determines that the motion information of the gesture is not matched (NO in step S109), the processing returns to step S101.

In step S110, the CPU 151 calculates the time elapsed since the last time point when the motion information of a gesture is determined to be matched in step S109. The processing then proceeds to step S111. In a case where the motion information is matched in step S109 for the first time, the processing proceeds to step S113.

In step S111, the CPU 151 determines whether the calculated elapsed time exceeds a predefined time. If the CPU 151 determines that the elapsed time is within the predefined time (within the predetermined time) (NO in step S111), the processing proceeds to step S112. If the CPU 151 determines that the elapsed time exceeds the predefined time (is not within the predetermined time) (YES in step S111), the processing proceeds to step S113.

In step S112, the CPU 151 sets both the motion information of the gesture determined to be matched in step S109 last time and the motion information of the gesture determined to be matched in step S109 this time as the targets of interest. The processing then proceeds to step S114.

In step S113, the CPU 151 sets only the motion information of the gesture determined to be matched in step S109 this time as the target of interest. The processing then proceeds to step S114.

In step S114, the CPU 151 detects coordinate information of the region of interest pointed by the gesture, using the motion information of the gesture set as the target of interest. In the case of setting the motion information of the gesture determined to be matched last time and the motion information of the gesture determined to be matched this time as the targets of interest, the CPU 151 detects the pieces of coordinate information of the regions of interest that correspond to the respective pieces of motion information. The processing then proceeds to step S115.

In step S115, the CPU 151 calculates the angle of view based on the coordinate information of all the regions of interest detected in step S114 and the coordinate information of the human body detected in step S102. The processing then proceeds to step S116.

In step S116, the CPU 151 generates a pan operation command so as to achieve the calculated angle of view, and outputs the generated operation command to the pan driving apparatus 120. The processing then proceeds to step S117.

In step S117, the CPU 151 determines whether a gesture detection function switch (not illustrated) of the imaging system 100 is turned OFF. If the CPU 151 determines that the gesture detection function switch is not turned OFF (NO in step S117), the processing returns to step S101. If the CPU 151 determines that the gesture detection function switch is turned OFF (YES in step S117), the series of angle-of-view control processing ends.

As described above, in a case where the person serving as the image capturing target makes continuous gestures, the imaging system 100 according to the present exemplary embodiment can capture an image of the person so as to achieve the optimum angle of view considering the continuously made gestures. For example, in the case of distributing the video image of a lecture, if the lecturer points a finger alternately at a slide and a blackboard in a short period of time in order to use the blackboard to explain the material presented on the slide, both the slide and the blackboard fall within the angle of view. In addition, in a case where the person serving as the image capturing target makes a one-shot gesture, the imaging system 100 can capture an image of the person so as to achieve the angle of view considering only the one-shot gesture. Accordingly, the imaging system 100 can capture an appropriate video image with the angle of view intended by the person serving as the image capturing target.

In the present exemplary embodiment, the CPU 151 records, in association with the time point when the motion information of the gesture is determined to be matched in step S109 of FIG. 2, the motion information of the gesture determined to be matched, but may record the coordinate information of the region of interest detected in step S114 of FIG. 2 as a modification example of the present exemplary embodiment. In this case, in a case where the motion information of the gesture determined to be matched last time is set as the target of interest, in step S114, the CPU 151 is to read out the coordinate information of the region of interest that is recorded in association with the last time point when the motion information is determined to be matched in step S109.

A second exemplary embodiment will be described below.

<Overall Configuration of Imaging System>

Figure 4:
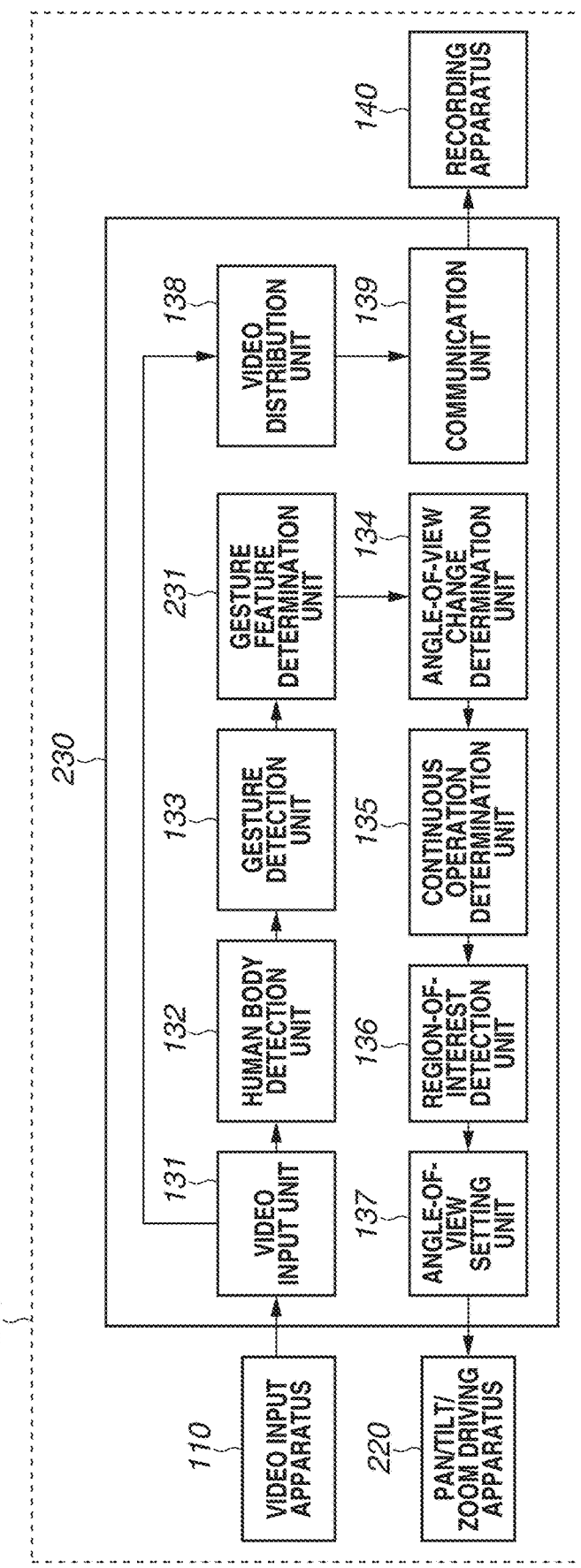
FIG. 4 is a block diagram illustrating an example of an overall configuration of an imaging system according to a second exemplary embodiment.

An example of an overall configuration of an imaging system 200 according to the present exemplary embodiment will be described next with reference to FIG. 4. As illustrated in FIG. 4, the imaging system 200 according to the present exemplary embodiment includes the video input apparatus 110, a pan/tilt/zoom driving apparatus 220, an imaging control apparatus 230, and the recording apparatus 140. In the present exemplary embodiment, the pan/tilt/zoom driving apparatus 220 is used instead of the pan driving apparatus 120 according to the first exemplary embodiment. In addition, the imaging system 200 includes the imaging control apparatus 230 according to the present exemplary embodiment. The same components as those according to the first exemplary embodiment are assigned the same reference numerals, and the detailed description thereof will be omitted. In the present exemplary embodiment, differences from the first exemplary embodiment will be mainly described.

The pan/tilt/zoom driving apparatus 220 changes an imaging direction (pan/tilt direction) and a zoom magnification of the video input apparatus 110, and includes a motor, a gear, and the like. When receiving a series of commands for performing a pan/tilt/zoom operation from the imaging control apparatus 230, the pan/tilt/zoom driving apparatus 220 controls the motor to perform the pan/tilt/zoom operation based on the received commands.

Similarly to the first exemplary embodiment, the imaging control apparatus 230 analyzes the video information of the image captured by the video input apparatus 110 and performs control to change the angle of view of the video input apparatus 110. More specifically, the imaging control apparatus 230 generates the commands for performing the pan/tilt/zoom operation based on a gesture detected from the video information. The imaging control apparatus 230 then outputs the generated commands to the pan/tilt/zoom driving apparatus 220.

<Hardware Configuration of Imaging Control Apparatus>

The imaging control apparatus 230 includes, as hardware components, the CPU 151, the storage device 152, the input/output interface 153, and the bus 154 that connects these components, similarly to the configuration illustrated in FIG. 1B.

Figure 5A:
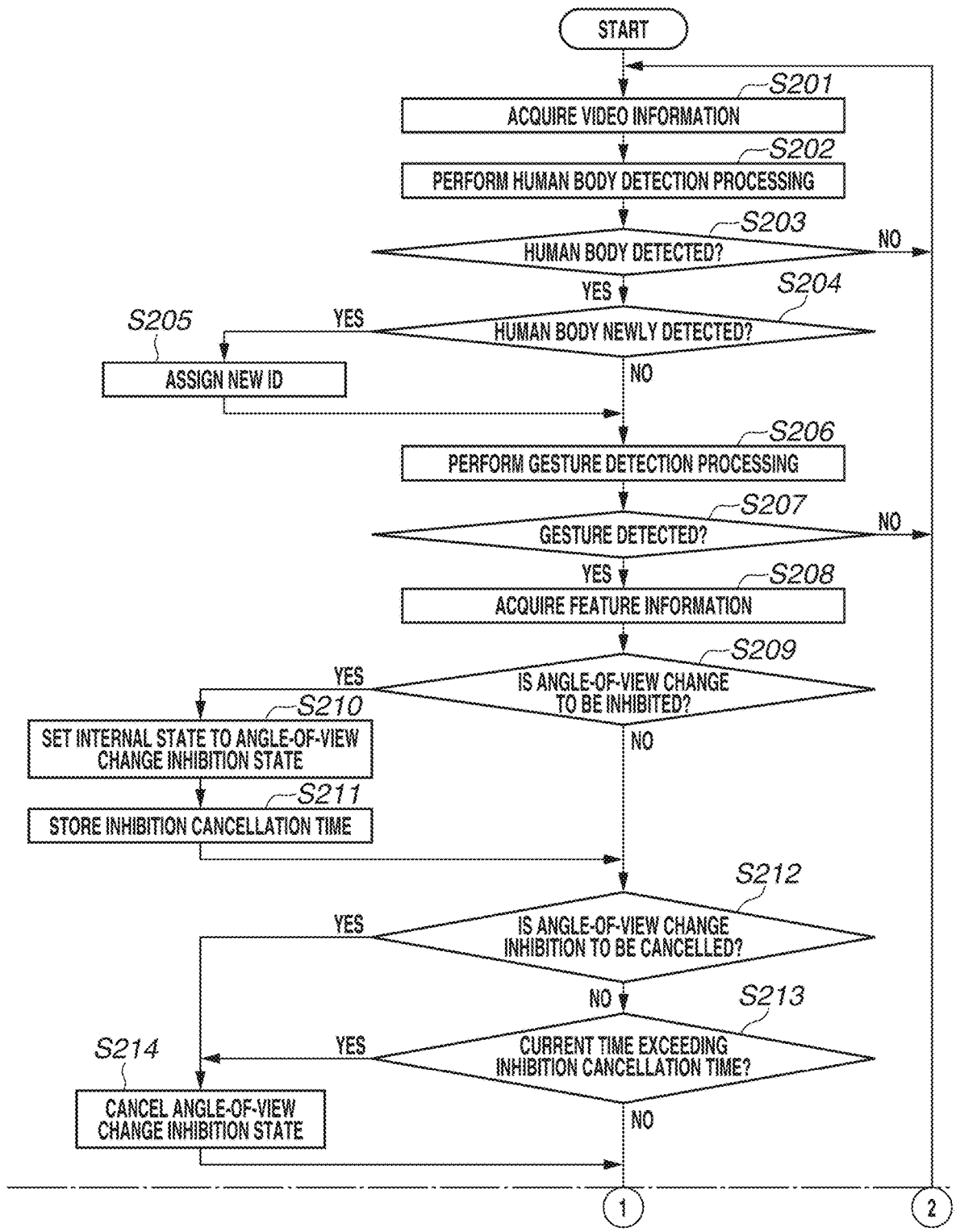
FIG. 5, consisting of 5A and 5B, is a flowchart illustrating angle-of-view control processing according to the second exemplary embodiment.
Figure 5B:
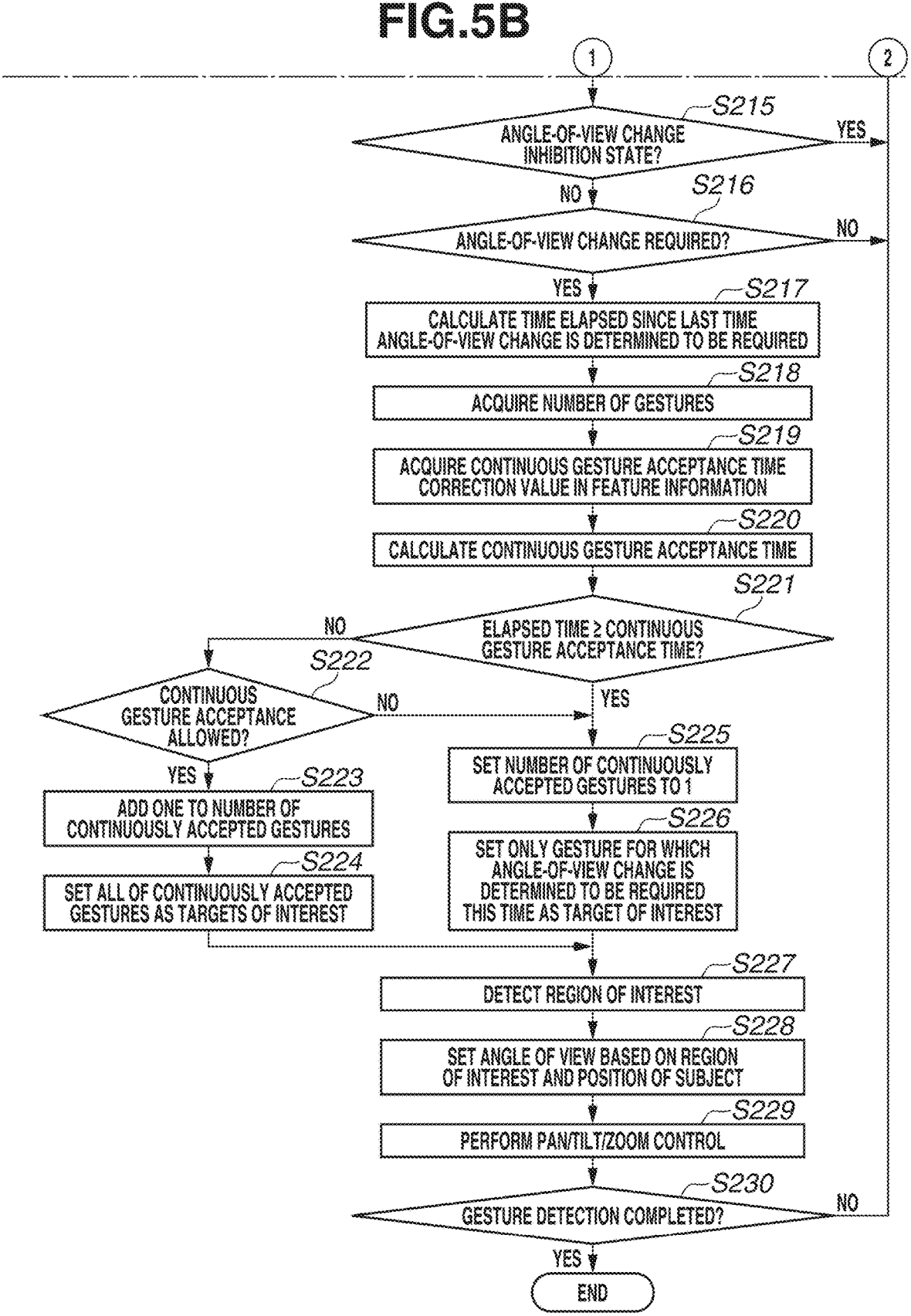

The CPU 151 controls the entire imaging control apparatus 230. Various functions of the imaging control apparatus 230 and processing in a flowchart illustrated in FIG. 5 are implemented by the CPU 151 performing processing based on a program stored in the storage device 152.

The storage device 152 is a RAM, a ROM, an HDD, or the like, and stores therein a program and data to be used when the CPU 151 performs processing based on the program.

The input/output interface 153 controls input and output between the imaging control apparatus 230 and an external apparatus such as the video input apparatus 110. The input/output interface 153 includes the video interface that connects the imaging control apparatus 230 and the recording apparatus 140.

<Functional Configuration of Imaging Control Apparatus>

The CPU 151 executes a program stored in the storage device 152 to cause the imaging control apparatus 230 to function as the video input unit 131, the human body detection unit 132, the gesture detection unit 133, a gesture feature determination unit 231, the angle-of-view change determination unit 134, the continuous operation determination unit 135, the region-of-interest detection unit 136, the angle-of-view setting unit 137, the video distribution unit 138, and the communication unit 139, as illustrated in FIG. 4. The imaging control apparatus 230 includes the gesture feature determination unit 231 in addition to the units of the imaging control apparatus 130 according to the first exemplary embodiment. The gesture feature determination unit 231 and components functionally different from those according to the first exemplary embodiment will be described next.

The gesture feature determination unit 231 determines feature information of the gesture detected in the gesture detection unit 133. More specifically, a database (hereinafter referred to as a feature information database) in which feature information regarding gestures is registered is pre-stored in the storage device 152. When receiving an input from the gesture detection unit 133, the gesture feature determination unit 231 reads out the feature information database. The gesture feature determination unit 231 searches the feature information database, using the motion information of the gesture detected by the gesture detection unit 133 as a key, and acquires the feature information corresponding to the detected gesture. The gesture feature determination unit 231 outputs the human body coordinate information, the ID information, the motion information of the detected gesture, and the video information, which are input from the gesture detection unit 133, and the feature information of the gesture to the angle-of-view change determination unit 134.

FIG. 6 is a diagram illustrating an example of the feature information database. The feature information regarding gestures is set in association with gesture motion information 601. Examples of the gesture motion information 601 include "point a finger at a region", "draw a circle surrounding a region with a finger", "make an "X" with both hands", and "put raised hands down". The gesture feature determination unit 231 performs matching between the gesture motion information 601 and the motion information of the gesture detected by the gesture detection unit 133, and acquires the feature information set in association with the matched gesture motion information 601. The acquired feature information is used in processing performed by the angle-of-view change determination unit 134 and processing performed by the continuous operation determination unit 135. The feature information includes information regarding an angle-of-view change 602, continuous gesture acceptance 603, a continuous gesture acceptance time correction value 604, a gesture inhibition processing flag 605, and a gesture inhibition time 606.

The angle-of-view change 602 is set to indicate whether an angle-of-view change is required. The continuous gesture acceptance 603 is set to indicate whether determination by the continuous operation determination unit 135 is valid or invalid. The continuous gesture acceptance time correction value 604 (corresponding to a correction time) is used by the continuous operation determination unit 135 to calculate a continuous gesture acceptance time. The gesture inhibition processing flag 605 is set to indicate whether an angle-of-view change is to be inhibited or the inhibition is to be canceled. The gesture inhibition time 606 is used to calculate an angle-of-view change inhibition cancellation time in a case where the gesture inhibition processing flag 605 is set to "inhibit".

In the present exemplary embodiment, when receiving the feature information from the gesture feature determination unit 231, the angle-of-view change determination unit 134 sets the internal state to an angle-of-view change inhibition state in a case where the gesture inhibition processing flag 605 in the feature information is set to "inhibit". Furthermore, the angle-of-view change determination unit 134 calculates the angle-of-view change inhibition cancellation time, using the time set as the gesture inhibition time 606 in the feature information, and stores the angle-of-view change inhibition cancellation time in the storage device 152. The gesture inhibition time 606 is the duration of the angle-of-view change inhibition state. For example, in a case where the gesture inhibition time 606 is set to "30 seconds", the angle-of-view change determination unit 134 stores the time after 30 seconds from the current time as the angle-of-view change inhibition cancellation time. In addition, in a case where the gesture inhibition processing flag 605 in the feature information is set to "cancel inhibition" or the current time is later than the angle-of-view change inhibition cancellation time stored in the storage device 152, the angle-of-view change determination unit 134 cancels the setting of the angle-of-view change inhibition state.

In the present exemplary embodiment, the angle-of-view change determination unit 134 determines whether the internal state is set to the angle-of-view change inhibition state and whether the angle-of-view change 602 in the feature information input from the gesture feature determination unit 231 is set to "required". In a case where the internal state is not set to the angle-of-view change inhibition state and the angle-of-view change 602 is set to "required", the angle-of-view change determination unit 134 determines that an angle-of-view change is required. In the present exemplary embodiment, if determining that an angle-of-view change is required, the angle-of-view change determination unit 134 stores the time when the determination is made, as the time point when the angle-of-view change gesture is made (which corresponds to the time point when the first determination processing is performed) in the storage device 152. In addition, the angle-of-view change determination unit 134 records the information input from the gesture feature determination unit 231 in the storage device 152 in association with the time point when the angle-of-view change gesture is made. The angle-of-view change determination unit 134 then outputs the human body coordinate information, the ID information, the motion information of the detected gesture, the feature information, and the video information, which are input from the gesture feature determination unit 231, to the continuous operation determination unit 135.

In the present exemplary embodiment, the continuous operation determination unit 135 calculates the continuous gesture acceptance time to be used to determine whether the angle-of-view change gestures are continuously performed. First, similarly to the first exemplary embodiment, when receiving an input from the angle-of-view change determination unit 134, the continuous operation determination unit 135 calculates the time elapsed since the last time point when the angle-of-view change gesture is made. Next, the continuous operation determination unit 135 compares the elapsed time and the continuous gesture acceptance time. The continuous gesture acceptance time Y is calculated by the following Expression (1), where the current number of continuously accepted gestures is X and the continuous gesture acceptance time correction value in the feature information input to the continuous operation determination unit 135 last time is Z. The method for calculating the continuous gesture acceptance time is not limited to the method using the following Expression (1), and may be another method as long as the continuous gesture acceptance time changes depending on the number of continuously accepted gestures. The number of continuously accepted gestures corresponds to the number of times the continuous operation determination unit 135 continuously determines that the angle-of-view change gestures are continuous gestures.

$$Y=(1.0+(X-1)\times 0.5)\times Z \qquad (1)$$

In a case where the elapsed time is shorter than the continuous gesture acceptance time as a result of the comparison, the continuous operation determination unit 135 determines that the angle-of-view change gesture made last time and the angle-of-view change gesture made this time are continuous gestures. The continuous operation determination unit 135 then adds one to the number of continuously accepted gestures stored in the storage device 152. In this manner, the continuous operation determination unit 135 counts the number of times of continuously determining that the angle-of-view change gestures are continuous gestures. Furthermore, the continuous operation determination unit 135 outputs the information input from the angle-of-view change determination unit 134 this time and all the information previously input from the angle-of-view change determination unit 134 together to the region-of-interest detection unit 136. For example, the continuous operation determination unit 135 reads out, from the storage device 152, pieces of information corresponding to the number of continuously accepted gestures from the latest among the information stored in association with the time point when the angle-of-view change gesture is made, and outputs the information to the region-of-interest detection unit 136.

In addition, in a case where the elapsed time is equal to or longer than the continuous gesture acceptance time as a result of the comparison, the continuous operation determination unit 135 determines that the angle-of-view change gesture made this time is a one-shot gesture. The continuous operation determination unit 135 then sets the number of continuously accepted gestures stored in the storage device 152 to 1, and outputs only the information input from the angle-of-view change determination unit 134 this time to the region-of-interest detection unit 136.

In the present exemplary embodiment, however, in a case where the continuous gesture acceptance 603 in the feature information input from the angle-of-view change determination unit 134 is not set to "allowed", the continuous operation determination unit 135 determines that the angle-of-view change gesture made this time is a one-shot gesture regardless of a result of the comparison. Also in this case, the continuous operation determination unit 135 sets the number of continuously accepted gestures stored in the storage device 152 to 1, and outputs only the information input from the angle-of-view change determination unit 134 this time to the region-of-interest detection unit 136. In this manner, in a case where the continuous gesture acceptance 603 in the feature information is set to "allowed", the determination processing by the continuous operation determination unit 135 is valid. In a case where the continuous gesture acceptance 603 in the feature information is not set to "allowed", the determination processing by the continuous operation determination unit 135 is invalid.

In the present exemplary embodiment, the angle-of-view setting unit 137 calculates the angle of view so that the human body and all the regions of interest are within the angle of view, based on the coordinate information of the human body and the coordinate information of all the regions of interest, which are input from the region-of-interest detection unit 136. Details of an angle-of-view calculation method will be described below with reference to FIG. 7. The angle-of-view setting unit 137 then generates a pan operation command, a tilt operation command, and a zoom operation command so as to achieve the calculated angle of view.

<Angle-of-View Calculation Method>

Figure 7:
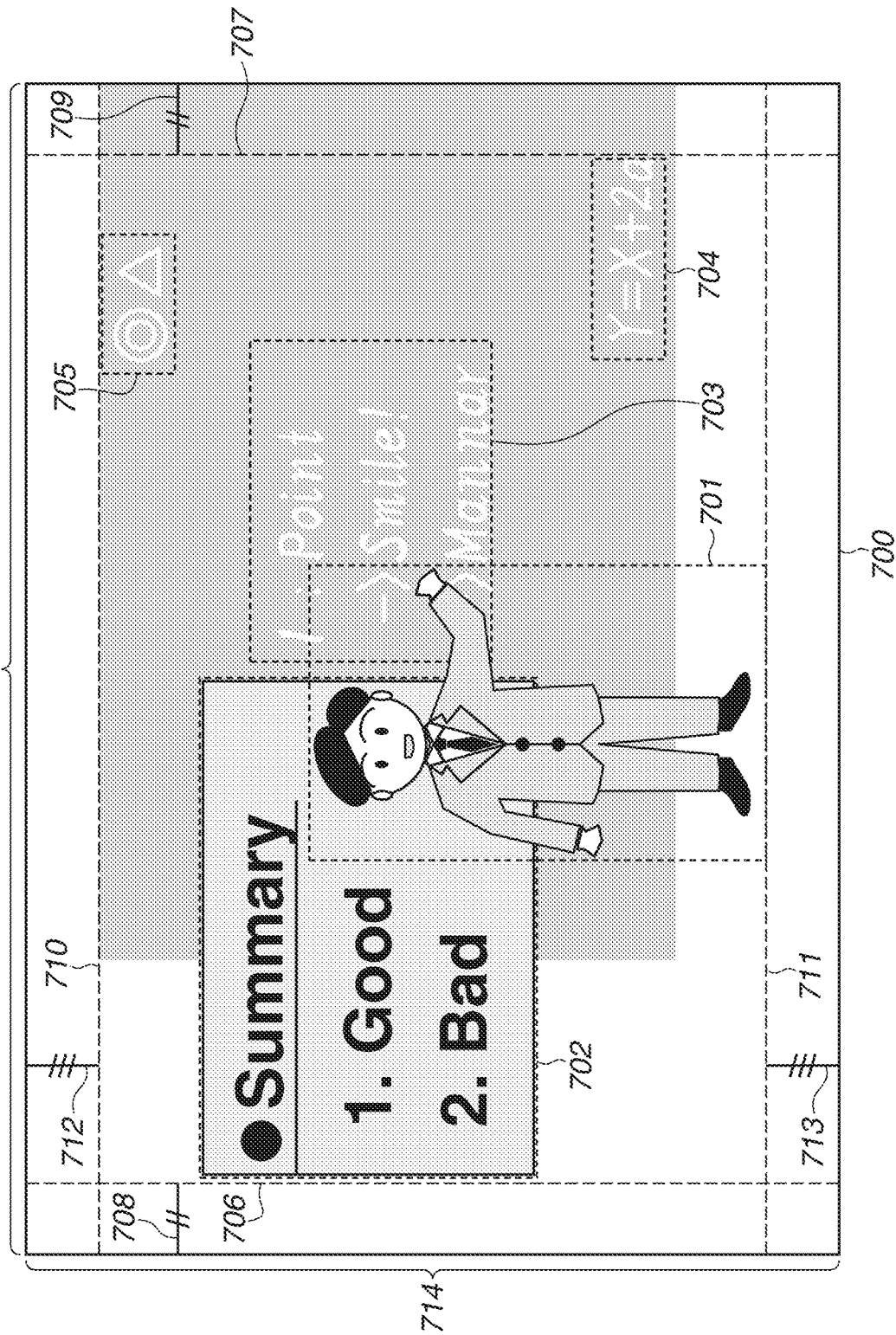
FIG. 7 is a diagram illustrating an angle-of-view calculation method according to the second exemplary embodiment.

An example of the angle-of-view calculation method according to the present exemplary embodiment will be described with reference to FIG. 7. The description will be given separately with respect to the pan direction, the tilt direction, and the zoom magnification. A video image 700 is captured by the imaging system 200 controlling the angle of view. The video image 700 includes regions 701 to 705. The region 701 corresponds to the coordinate information of the human body that makes the gesture. The regions 702 to 705 correspond to the respective pieces of coordinate information of the regions of interest.

First, the method for calculating the angle of view in the pan direction will be described. The angle-of-view setting unit 137 calculates an x-coordinate at the leftmost end among the coordinates of all the human bodies and the coordinates of all the regions of interest. In this example, the x-coordinate at the leftmost end is a left end coordinate 706. A left end margin 708 is a distance in the x-coordinate from the left end of the angle of view of the video image 700 to the left end coordinate 706. Similarly, a right end coordinate 707 is an x-coordinate at the rightmost end among the coordinates of all the human bodies and the coordinates of all the regions of interest. A right end margin 709 is a distance in the x-coordinate from the right end of the angle of view of the video image 700 to the right end coordinate 707. The angle-of-view setting unit 137 calculates the angle of view in the lateral direction (pan direction) so as to make the distance of the left end margin 708 and the distance of the right end margin 709 equal to each other.

Next, the method for calculating the angle of view in the tilt direction will be described. The angle-of-view setting unit 137 calculates a coordinate in a longitudinal direction (hereinafter referred to as a y-coordinate) at the topmost end among the coordinates of all the human bodies and the coordinates of all the regions of interest. In this example, the y-coordinate at the topmost end is a top end coordinate 710. A top end margin 712 is a distance in the y-coordinate from the top end of the angle of view of the video image 700 to the top end coordinate 710. Similarly, a bottom end coordinate 711 is a y-coordinate at the bottommost end among the coordinates of all the human bodies and the coordinates of all the regions of interest. A bottom end margin 713 is a distance in the y-coordinate from the bottom end of the angle of view of the video image 700 to the bottom end coordinate 711. The angle-of-view setting unit 137 calculates the angle of view in the longitudinal direction (tilt direction) so as to make the distance of the top end margin 712 and the distance of the bottom end margin 713 equal to each other.

Finally, the method for calculating the zoom magnification will be described. The zoom magnification is calculated so as to satisfy the following two conditions. The first condition is a condition for zoom in the x-coordinate. More specifically, assuming that a breadth 715 is the lateral length of the angle of view of the video image 700, the first condition is that the distances of the left end margin 708 and the right end margin 709 are set to be 10% or more of the breadth 715. The second condition is a condition for zoom in the y-coordinate. More specifically, assuming that a length 714 is the longitudinal length of the angle of view of the video image 700, the second condition is that the distances of the top end margin 712 and the bottom end margin 713 are set to be 10% or more of the length 714. The angle-of-view setting unit 137 calculates a maximum zoom magnification that satisfies the two conditions.

<Angle-of-View Control Processing>

Next, angle-of-view control processing performed by the imaging system 200 according to the present exemplary embodiment will be described with reference to a flowchart illustrated in FIG. 5. The angle-of-view control processing is started when the imaging system 200 is activated by the user's operation.

First, in steps S201 to S206, the CPU 151 performs processing similar to the processing in steps S101 to S106 illustrated in FIG. 2.

In step S207, the CPU 151 determines whether a gesture is detected. If the CPU 151 determines that a gesture is detected (YES in step S207), the processing proceeds to step S208. If the CPU 151 determines that no gesture is detected (NO in step S207), the processing returns to step S201.

In step S208, the CPU 151 acquires feature information of the detected gesture from the feature information database. The processing then proceeds to step S209.

In step S209, the CPU 151 determines whether the gesture inhibition processing flag 605 in the feature information acquired in step S208 is set to "inhibit". If the CPU 151 determines that the gesture inhibition processing flag 605 is set to "inhibit" (YES in step 209), the processing proceeds to step S210. If the CPU 151 determines that the gesture inhibition processing flag 605 is not set to "inhibit" (NO in step S209), the processing proceeds to step S212.

In step S210, the CPU 151 sets the internal state to the angle-of-view change inhibition state. The processing then proceeds to step S211.

In step S211, the CPU 151 calculates the angle-of-view inhibition cancellation time based on the time set as the gesture inhibition time 606 in the feature information acquired in step S208, and stores the angle-of-view inhibition cancellation time in the storage device 152. The processing then proceeds to step S212.

In step S212, the CPU 151 determines whether the gesture inhibition processing flag 605 in the feature information acquired in step S208 is set to "cancel inhibition". If the CPU 151 determines that the gesture inhibition processing flag 605 is set to "cancel inhibition" (YES in step S212), the processing proceeds to step S214. If the CPU 151 determines that the gesture inhibition processing flag 605 is not set to "cancel inhibition" (NO in step S212), the processing proceeds to step S213.

In step S213, the CPU 151 determines whether the current time is later than the angle-of-view inhibition cancellation time stored in the storage device 152. If the CPU 151 determines that the current time is later than the angle-of-view inhibition cancellation time (YES in step S213), the processing proceeds to step S214. If the CPU 151 determines that the current time is not later than the angle-of-view inhibition cancellation time (NO in step S213), the processing proceeds to step S215.

In step S214, the CPU 151 cancels the angle-of-view change inhibition state as the internal state. The processing then proceeds to step S215.

In step S215, the CPU 151 determines whether the internal state is the angle-of-view change inhibition state. If the CPU 151 determines that the internal state is the angle-of-view change inhibition state (YES in step S215), the processing returns to step S201. If the CPU 151 determines that the internal state is not the angle-of-view change inhibition state (NO in step S215), the processing proceeds to step S216.

In step S216, the CPU 151 determines whether the angle-of-view change 602 in the feature information acquired in step S208 is set to "required". If the CPU 151 determines that the angle-of-view change 602 is set to "required" (YES in step S216), the processing proceeds to step S217. If the CPU 151 determines that the angle-of-view change 602 is not set to "required" (NO in step S216), the processing returns to step S201.

In step S217, the CPU 151 calculates the time elapsed since the last time point when the angle-of-view change 602 is determined to be set to "required" in step S216. The processing then proceeds to step S217. In a case where the angle-of-view change 602 is determined to be set to "required" in step S216 for the first time, the processing proceeds to step S225.

In step S218, the CPU 151 acquires the number of continuously accepted gestures stored in the storage device 152. The processing then proceeds to step S219.

In step S219, the CPU 151 acquires the value set as the continuous gesture acceptance time correction value 604 in the feature information acquired in step S208. The CPU 151 may read out the feature information acquired in step S208 last time from the storage device 152 and acquire the value set as the continuous gesture acceptance time correction value 604 in the read out feature information. The processing then proceeds to step S220.

In step S220, the CPU 151 calculates the continuous gesture acceptance time, using the number of continuously accepted gestures and the value set as the continuous gesture acceptance time correction value 604. The processing then proceeds to step S221.

In step S221, the CPU 151 determines whether the elapsed time calculated in step S217 is equal to or longer than the continuous gesture acceptance time calculated in step S220. If the CPU 151 determines that the elapsed time is equal to or longer than the continuous gesture acceptance time (YES in step S221), the processing proceeds to step S225. If the CPU 151 determines that the elapsed time is shorter than the continuous gesture acceptance time (NO in step S221), the processing proceeds to step S222.

In step S222, the CPU 151 determines whether the continuous gesture acceptance 603 in the feature information acquired in step S208 is set to "allowed". If determining that the continuous gesture acceptance 603 is set to "allowed" (YES in step S222), the CPU 151 stores, in the storage device 152, the motion information of the gesture for which the continuous gesture acceptance 603 is determined to be set to "allowed", in association with the time point when the continuous gesture acceptance 603 is determined to be set to "allowed", and the processing proceeds to step S223. If the CPU 151 determines that the continuous gesture acceptance 603 is not set to "allowed" (NO in step S222), the processing proceeds to step S225.

In step S223, the CPU 151 adds one to the number of continuously accepted gestures stored in the storage device 152. The processing then proceeds to step S224.

In step S224, the CPU 151 sets all the continuously made gestures as the targets of interest. The processing then proceeds to step S227.

In step S225, the CPU 151 sets the number of continuously accepted gestures stored in the storage device 152 to 1. The processing then proceeds to step S226.

In step S226, the CPU 151 sets only the motion information of the gesture for which the angle-of-view change 602 is determined to be set to "required" in step S216 this time, as the target of interest. The processing then proceeds to step S227.

In step S227, the CPU 151 detects the coordinate information of the regions of interest pointed by the gestures, using the motion information of all the gestures set as the targets of interest. The processing then proceeds to step S228.

In step S228, the CPU 151 calculates the angle of view based on the coordinate information of all the regions of interest detected in step S227 and the coordinate information of the human body detected in step S102. The processing then proceeds to step S229.

In step S229, the CPU 151 generates pan/tilt/zoom operation commands so as to achieve the calculated angle of view, and outputs the generated operation commands to the pan/tilt/zoom driving apparatus 220. The processing then proceeds to step S230.

In step S230, the CPU 151 determines whether the gesture detection function switch (not illustrated) of the imaging system 100 is turned OFF. If the CPU 151 determines that the gesture detection function switch is not turned OFF (NO in step S230), the processing returns to step S201. If the CPU 151 determines that the gesture detection function switch is turned OFF (YES in step S230), the series of angle-of-view control processing ends.

As described above, in a case where the person serving as the image capturing target makes continuous gestures, the imaging system 200 according to the present exemplary embodiment can capture an image of the person so as to achieve the optimum angle of view considering all the continuously made gestures. For example, in a case where three or more gestures are continuously made in a short period of time, the imaging system 200 can capture an image so as to achieve the optimum angle of view considering the continuous three or more gestures. In addition, depending on the gestures made, the imaging system 200 can implement control considering only the last gesture or control to inhibit an angle-of-view change even if the gestures are continuously made. Accordingly, the imaging system 200 can capture an appropriate video image with the angle of view intended by the person serving as the image capturing target.

While the exemplary embodiments of the present disclosure have been described above, the exemplary embodiments are merely concrete examples of carrying out the present disclosure, and the technical scope of the present disclosure should not be interpreted in a limited manner based on the exemplary embodiments. The present disclosure can be implemented in various modes without departing from the technical idea or the principal features of the present disclosure.

The exemplary embodiments of the present disclosure can also be implemented by processing in which a program for implementing one or more functions according to the exemplary embodiments described above is supplied to a system or an apparatus via a network or a storage medium, and one or more processors in a computer of the system or the apparatus read out and execute the program. The exemplary embodiments of the present disclosure can also be implemented by a circuit (e.g., an application-specific integrated circuit (ASIC)) for implementing one or more functions according to the exemplary embodiments.

According to the exemplary embodiments described above, an image can be captured with an appropriate angle of view based on a gesture of the person serving as the image capturing target.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-087630, filed May 19, 2020, which is hereby incorporated by reference herein in its entirety.

What is claimed is:

1. An imaging control apparatus comprising a computer executing instructions that, when executed by the computer, cause the computer to:
receive an image from an imaging unit;
detect a gesture of a person in the image;
perform first determination processing for determining whether the gesture is a predetermined gesture;

perform, in a case where the gesture is determined at a first time point to be the predetermined gesture in the first determination processing, second determination processing for determining whether a time elapsed since a second time point at which it is previously determined in the first determination processing that the detected gesture is the predetermined gesture is within a predetermined time; and change an angle of view of the imaging unit based on a result of the determination in the second determination process.

2. The imaging control apparatus according to claim 1, wherein the instructions cause the computer to detect, from an image received from the imaging unit, a region of interest corresponding to motion information of the gesture determined to be the predetermined gesture in the first determination processing, wherein in a case where it is determined in the second determination process that the elapsed time is within the predetermined time, the angle of view of the imaging unit is changed based on a detected region of interest corresponding to motion information of the gesture determined at the first time point to be the predetermined gesture and a detected region of interest corresponding to motion information of the gesture determined at the second time point to be the predetermined gesture.

3. The imaging control apparatus according to claim 2, wherein in a case where it is determined that the elapsed time is within the predetermined time, the instructions causes the computer to detect the region of interest corresponding to the motion information of the gesture determined at the first time point to be the predetermined gesture and detect the region of interest corresponding to the motion information of the gesture determined at the second time point to be the predetermined gesture.

4. The imaging control apparatus according to claim 2, wherein the instructions cause the computer to count a number of times of continuously determining that the elapsed time is within the predetermined time, and wherein the instructions cause the computer to, based on the counted number of times, detect a region of interest corresponding to motion information of a gesture determined to be the predetermined gesture in the first determination processing before the second time point.

5. The imaging control apparatus according to claim 4, wherein the instructions cause the computer to change the predetermined time based on the counted number of times.

6. The imaging control apparatus according to claim 2, wherein the determination in the second determination process can be set as valid or invalid for the predetermined gesture, and wherein, in a case where the determination by the second determination process is set to be valid for the predetermined gesture and it is determined in the second determination process that the elapsed time is within the predetermined time, the instructions cause the computer to detect the region of interest corresponding to the motion information of the gesture determined at the first time point to be the predetermined gesture and detect the region of interest corresponding to the motion information of the gesture determined at the second time point to be the predetermined gesture.

7. The imaging control apparatus according to claim 2, wherein the instructions cause the computer to perform control so that all the detected regions of interest are included in the angle of view of the imaging unit.

8. The imaging control apparatus according to claim 1, wherein the instructions cause the computer to analyze the image to detect region information of the person, wherein the angle of view of the imaging unit is changed based on the region information of the detected person.

9. The imaging control apparatus according to claim 1, wherein the instructions cause the computer to determine whether the detected gesture is a gesture for which an angle-of-view change is to be inhibited, and set an angle-of-view change inhibition state in a case where the detected gesture is determined to be the gesture for which an angle-of-view change is to be inhibited, and wherein the instructions cause the computer to, in a case where the angle-of-view change inhibition state is set, not change the angle of view even in a case where it is determined in the first determination process that the detected gesture is the predetermined gesture.

10. The imaging control apparatus according to claim 9, wherein the instructions cause the computer to determine whether the detected gesture is a gesture for which the angle-of-view change inhibition state is to be canceled, and cancel the angle-of-view change inhibition state in a case where the detected gesture is determined to be the gesture for which the angle-of-view change inhibition state is to be canceled, and wherein the instructions cause the computer to change the angle of view in a case where it is determined in the first determination process that the detected gesture is the predetermined gesture after the angle-of-view change inhibition state is canceled.

11. The imaging control apparatus according to claim 9, wherein a duration of the angle-of-view change inhibition state is set for the gesture for which an angle-of-view change is to be inhibited, wherein the instructions cause the computer to cancel the angle-of-view change inhibition state in a case where the duration elapses since a time point when the detected gesture is determined to be the gesture for which an angle-of-view change is to be inhibited, and wherein the instructions cause the computer to change the angle of view in a case where it is determined in the first determination process that the detected gesture is the predetermined gesture after the angle-of-view change inhibition state is canceled.

12. The imaging control apparatus according to claim 1, wherein the instructions cause the computer to control an operation in a pan direction of the imaging unit.

13. The imaging control apparatus according to claim 1, wherein the instructions cause the computer to control an operation in a tilt direction of the imaging unit.

14. The imaging control apparatus according to claim 1, wherein the instructions cause the computer to control a zoom magnification of the imaging unit.

15. An imaging control method comprising:
receiving an image from an imaging unit;
detecting a gesture of a person in the image;
performing first determination processing for determining whether the detected gesture is a predetermined gesture;
in a case where the gesture is determined at a first time point to be the predetermined gesture in the first determination processing, secondly determining whether a time elapsed since a second time point at which it is previously determined in the first determination processing that the detected gesture is the predetermined gesture is within a predetermined time; and changing an angle of view of the imaging unit based on a result of the secondly determining.

16. A non-transitory computer readable storage medium that stores instructions that can be read by a computer, the instructions, when executed, causing the computer to perform an imaging control method comprising:

receiving an image from an imaging unit;

detecting a gesture of a person in the image;

performing first determination processing for determining whether the detected gesture is a predetermined gesture;

in a case where the gesture is determined at a first time point to be the predetermined gesture in the first determination processing, secondly determining whether a time elapsed since a second time point at which it is previously determined in the first determination processing that the detected gesture is the predetermined gesture is within a predetermined time; and changing an angle of view of the imaging unit based on a result of the secondly determining.

\* \* \* \* \*